United States Patent [19]

Katakura et al.

[11] Patent Number: 4,751,847

[45] Date of Patent: Jun. 21, 1988

[54] ULTRASONIC VELOCITY METER

[75] Inventors: Kageyoshi Katakura; Toshio Ogawa, both of Tokyo; Ishikawa Shizuo, Kanagawa; Hisashi Nishiyama; Mashio Kodama, both of Tokyo, all of Japan

[73] Assignees: Hitachi Medical Corp.; Hitachi Ltd., both of Japan

[21] Appl. No.: 5,900

[22] Filed: Jan. 22, 1987

[30] Foreign Application Priority Data

Jan. 22, 1986 [JP] Japan ................................. 61-10117

[51] Int. Cl.⁴ ............................................. G01N 29/00
[52] U.S. Cl. ................................. 73/629; 73/861.25; 128/663
[58] Field of Search ..................... 73/627, 629, 861.25; 128/663

[56] References Cited

U.S. PATENT DOCUMENTS 4,583,552  4/1986  Iinuma ........................... 73/861.25 X
4,671,294  6/1987  Magnin et al. ............... 73/861.25 X

OTHER PUBLICATIONS

Baker, D. W., Pulsed Ultrasonic Doppler Blood-Flow Sensing, IEEE Transactions . . . Ultrasonics, vol. SU-17, No. 3, Jul. 1970, pp. 170–185.

*Primary Examiner*—Jerry W. Myracle
*Attorney, Agent, or Firm*—Antonelli, Terry & Wands

[57] ABSTRACT

A phase difference comparison type of ultrasonic velocity meter repeatedly transmitting acoustic waves in the form of pulses at alternate time intervals: $T-T_S$ and $T+T_S$, receiving reflected waves generated by the transmission of these waves and reflected on an object, forming first and second mixed waves by mixing the reception signal obtained from the reflected waves with two reference waves having phases shifted 90 degrees from each other, detecting the phase difference between the present vectors representing the first and second mixed waves and similar vectors which have been obtained with respect to the preceding pulse transmission, detecting the phase difference Q between the phase difference caused in relation to the time interval $T-T_S$ and the phase difference caused in relation to the time interval $T+T_S$ with respect to a phase difference obtained each time a pulse is transmitted, and calculating the Droppler shift angle frequency $\omega d$ from $\omega d = Q/2T_S$.

8 Claims, 6 Drawing Sheets

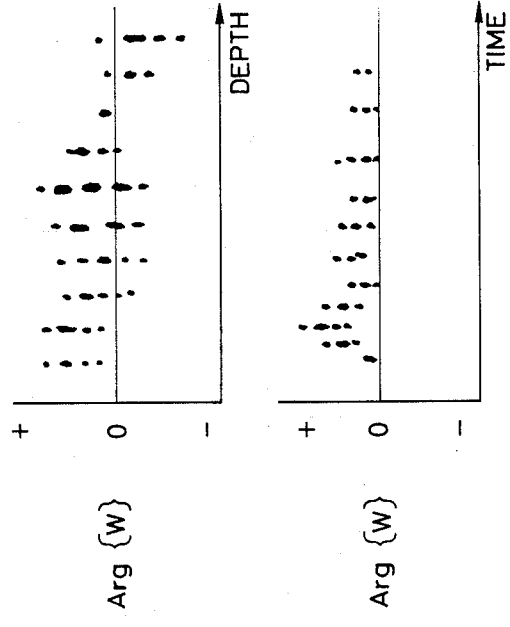
FIG. 9A
FIG. 9B
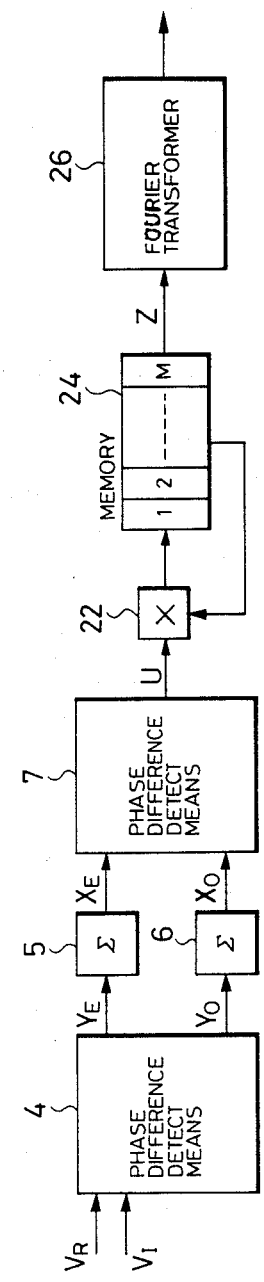
FIG. 10

ULTRASONIC VELOCITY METER

BACKGROUND OF THE INVENTION

This invention relates to an apparatus for measuring the velocity of an object through the medium of an ultrasonic wave, and more particularly to an apparatus for measuring, in a real-time manner, the velocity of a blood stream in an organism.

Various types of apparatus for detecting the velocity of an object on the basis of the Doppler effect have been known. In an apparatus operated in accordance with a pulse Doppler method (such as that reported in "IEEE TRANSACTION ON SONICS AND ULTRASONICS" Vol. SU-17, No. 3, July 1970, p.p. 170 to 185"), ultrasonic pulses are repeatedly transmitted toward an object to be measured, and a signal obtained from a received wave undergoes a time gate process, thereby ascertaining a portion of the object measured.

In this pulse Doppler method, if the time interval at which the transmission of the ultrasonic pulse is repeated is T, the measurable maximum doppler shift frequency fd is ½ T. On the other hand, if the propagation velocity of an acoustic wave transmitted toward the object is S, the depth D upto which the object can be measured (hereinafter referred to as the measurable depth) is S/2. Accordingly, the product of the fd and D is S/4 which is constant. The measurable velocity or measurable depth is thus limited.

SUMMARY OF THE INVENTION

It is therefore an object of the present invention to eliminate a limit specific to the conventional method such as that defined by the constant product of the measurable depth and the maximum measurable doppler shift frequency, and to ensure that the velocity of an object moving at a higher speed in a deeper region can be measured.

In the arrangement according to the present invention, the pulse spacing of the transmission of ultrasonic waves is periodically shifted from the regular period, and the phase differences of reflection signals obtained from that pulse train are separated into a plurality of groups, thereby eliminating a limit such as that defined above.

Other features of the present invention will be clear upon reading the description of the preferred embodiments given below.

BRIEF DESCRIPTION OF THE DRAWINGS

FIGS. 8 and 10 are block diagrams of other embodiments of the present invention;

FIGS. 9A and 9B are graphs of examples of the display of the embodiment shown in FIG. 8.

DESCRIPTION OF THE PREFERRED EMBODIMENTS

The present invention will be described below with respect to preferred embodiments thereof.

Figure 1:
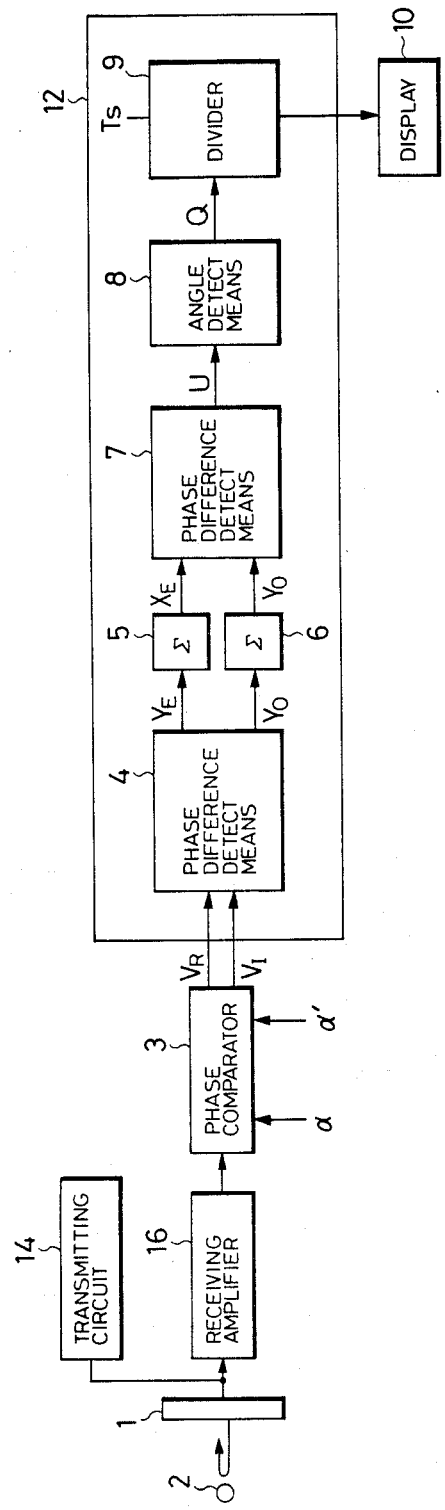
FIG. 1 is a block diagram of the construction of an embodiment of the present invention.
Figure 2:
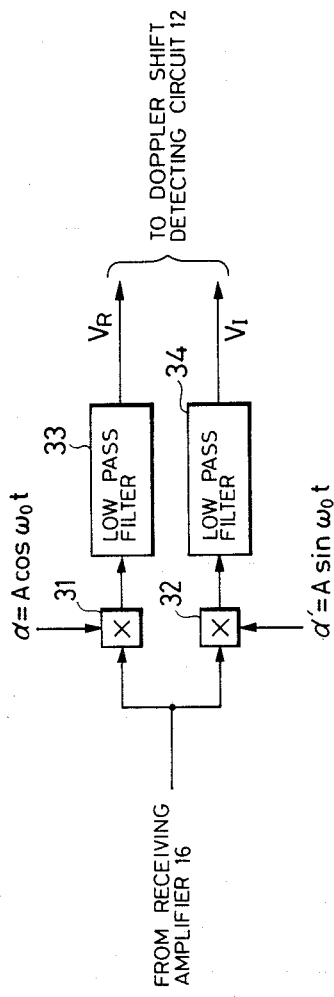
FIGS. 2, 4, 6A and 6B are block diagrams of circuitries of the embodiment shown in FIG. 1.

In the embodiment shown in FIG. 1, a wave transmitting circuit 14 and a receiving amplifier 16 are connected to an acoustic transducer 1. Transmission signals in the form of short pulses at a predetermined angle frequency $\omega_0$ are repeatedly transmitted from the transmitting circuit 14 to the acoustic transducer 1, and acoustic pulse waves having a component of a center frequency $\omega_0$ are transmitted by the acoustic transducer 1 toward a reflector 2. A wave reflected by the reflector 2 is detected by the acoustic transducer 1. The received signal thereby detected is supplied to a phase comparator 3 by way of the receiving amplifier 16. The constitution of the phase comparator 3 is shown in FIG. 2. A mixer 31 mixes the received signal with a reference wave which is represented by $\alpha = A \cos \omega_0 t$, and a mixer 32 mixes the received signal with a reference wave which is represented by $\alpha' = A \sin \omega_0 t$. The outputs of these mixers are output by way of low-pass filters 33 and 34. That is, an output $V_R$ is a low-frequency component of a mixed wave consisting of the received signal and the reference wave $\alpha$; and an output $V_T$ is a low frequency component of a mixed wave consisting of the received signal and reference wave $\alpha'$, the phase difference between these two reference waves being shifted 90 degrees.

Figures 3A, 3B, 3C, 3D, 3E, 3F:
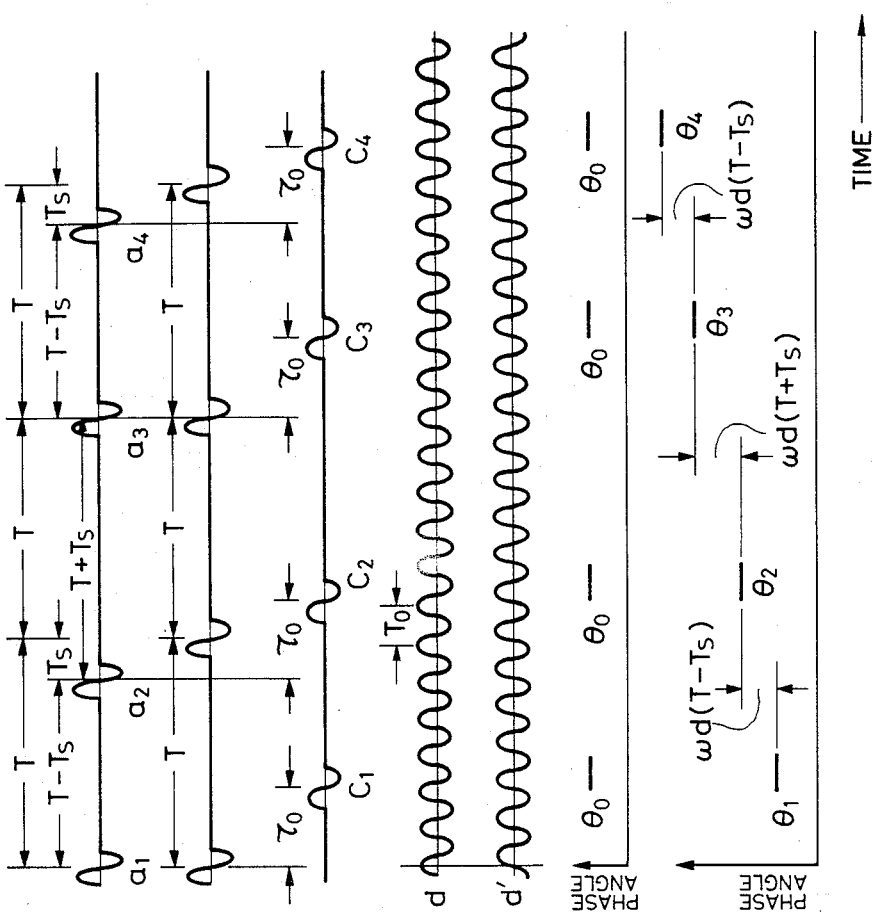
FIGS. 3A to 3F and 5 are time charts of the operation of the embodiment shown in FIG. 1.

FIGS. 3A to 3D show wave forms at the above described portions of this embodiment. The transmitting circuit 14 transmits waves on the basis of the timing shown in FIG. 3A. The interval between a first transmission pulse $a_1$ and a second transmission pulse $a_2$ is $T - T_S$; the interval between the second transmission pulse $a_2$ and a third transmission pulse $a_3$ is $T + T_S$; and the interval between the third transmission pulse $a_3$ and a fourth transmission pulse $a_4$ is $T - T_S$. The intervals of pulses which follow are alternately represented by time differences: $T - T_S$ and $T + T_S$. $T_S$ is a predetermined period of time shorter than $T$, and each of $T - T_S$ and $T + T_S$ is an integral multiple of a period $2\pi/\omega_0$ of the transmission pulses and the reference waves. FIG. 3B shows, for comparison, a transmission wave form in accordance with the conventional pulse Doppler method, namely, the wave form of transmission pulses issued at regular intervals.

Received signals which are displayed by reflected acoustic waves obtained when the pulses shown in FIG. 3A are transmitted are such as indicated by $C_1$, $C_2$, $C_3$ . . . in FIG. 3C. These received signals display delay $\tau_0$ from the transmission pulses $a_1$, $a_2$ and $a_3$ which correspond to the period of time taken by the acoustic wave to go between the transducer 2 and the reflector 2 and return back again. These received signals $C_1$, $C_2$ $C_3$ . . . are mixed with the two reference waves shown in FIG. 3D by the phase comparators to be compared with each other with respect to phase. Outputs of the phase comparator issued in response to the receiving signals $C_n$ (n=1, 2, 3 . . .) are represented by $V_{Rn}$ and $V_{In}$ (n=1, 2, 3 . . .) which are:

$$V_{Rn} = A_n \cos \theta_n$$
$$V_{In} = A_n \sin \theta_n.$$

These are arranged into an equation:

$$V_n = V_{Rn} + jV_{In} = A_n e^{j\theta_n}.$$

$V_{Rn}$ and $V_{In}$ are respectively assumed to be the real part and the imaginary part of the vector $V_n$. The phase angle $\theta_n$ of the vector $V_n$ displays a constant value $\theta_0$, as shown in FIG. 3E, if the reflector 2 is immobile.

On the other hand, if the reflector 2 moves at a speed defined by a doppler angular frequency ωd, the phase angle of the received signal approximately moves relative to the reference signals α and α' by an angle ωd per unit time. Accordingly, the phase angle $\theta_n$ of the vector $V_n$ moves at the angular frequency ωd so that the phase difference $\phi_E$ between $V_n$ and $V_{n+1}$, when is an even number, is represented by an equation:

$$\phi_E = \omega d(T + T_S).$$

When n is an odd number, the phase difference $\phi_O$ between $V_n$ and $V_{n+1}$ is $$\phi_O = \omega d(T - T_S).$$

The doppler shift detecting circuit 12 shown in FIG. 1 detects these phase differences $\phi_E$ and $\phi_O$, obtains the difference between $\phi_E$ and $\phi_O$, namely, $2\omega d T_S$, and calculates the Doppler angular frequency ωd.

The operation of the doppler shift detection circuit will be described with reference to the functional blocks shown within the block 12 of FIG. 1. A phase difference detecting means 4 detects, with respect to the vector $V_n(=V_{Rn}+jV_{In})$, a vector $Y_n$ which indicates the phase difference between the vector $V_n$ and the vector $V_{n+1}$ detected in the preceding step. By employing $V^*_n$ which is the complex conjugate of $V_n$, $Y_n$ is calculated from an equation:

$$Y_n = V_{n+1} \cdot V^*_n.$$

If $Y_n = Y_E$ when n is an even number and $Y_n = Y_O$ when n is an odd number, $Y_E$ and $Y_O$ are represented by equations:

$$Y_E = B e^{j\omega d(T+T_S)} = B e^{j\phi_E}$$

$$Y_O = B' e^{j\omega d(T-T_S)} = B e^{j\phi_O}.$$

Since these vectors $Y_E$ and $Y_O$ fluctuate under the influence of noise, the process of detecting the vector $Y_n$ is repeated with respect to reflected signals which can be repeated, and additions are effected with respect to $Y_E$ and $Y_O$ by vector adders 5 and 6. If the results of these additions are $X_E$ and $X_O$ after the additions have been repeated a certain number of times (e.g., eight times, respectively), $X_E$ and $X_O$ are:

$$X_E = \Sigma Y_E = D\, e^{j\overline{\phi}_E}$$

$$X_O = \Sigma Y_O = D'\, e^{j\overline{\phi}_O}$$

The phases $\overline{\phi}_E$ and $\overline{\phi}_O$ of the vectors $X_E$ and $X_O$ are means of the phases of the vectors $Y_E$ and $Y_O$ respectively. Therefore, $X_E$ and $X_O$ are adopted as the vectors which indicate correct values of $\phi_E$ and $\phi_O$.

Then, a vector U which represents the phase difference between $X_E$ and $X_O$ is obtained by a phase difference detecting means 7 the constitution of which is equivalent to that of the phase difference detecting means 4. The vector U of the output 7a of the phase difference detecting means 7 is:

$$U = X_E X_O^*$$
and
$$U = DD' e^{j(\overline{\phi}_E - \overline{\phi}_O)} = DD' e^{2j\overline{\omega d}\, T_S} = U_R + jU_I.$$

The values of the vector U is input into an angle detecting means 8, and an angle: $Q = 2\overline{\omega d} T_S$ is obtained. This angle detecting means 8 performs a calculation:

$$Q = \tan^{-1}\left(\frac{U_I}{U_R}\right)$$

In this case, $T_S$ is known, and a divider 9 calculates an equation:

$$\overline{\omega d} = \frac{Q}{2T_S}.$$

The amount of a frequency fluctuation $\overline{\omega d}$ is thereby obtained, and the velocity of the reflector is found.

To facilitate understanding, the operation of the embodiment has been described with respect to the case in which there is only one reflector. Since, in fact, this embodiment has been designed to obtain the distribution of blood stream velocity, etc., the Doppler shift detecting circuit 12 is arranged to detect ωd through the distance between a probe and each of different portions to be measured, namely, points at different depths below the surface of the skin. The constitution and operation of each section of the Doppler shift detecting circuit 12 shown in FIG. 1 will be further described in detail below.

Figure 4:
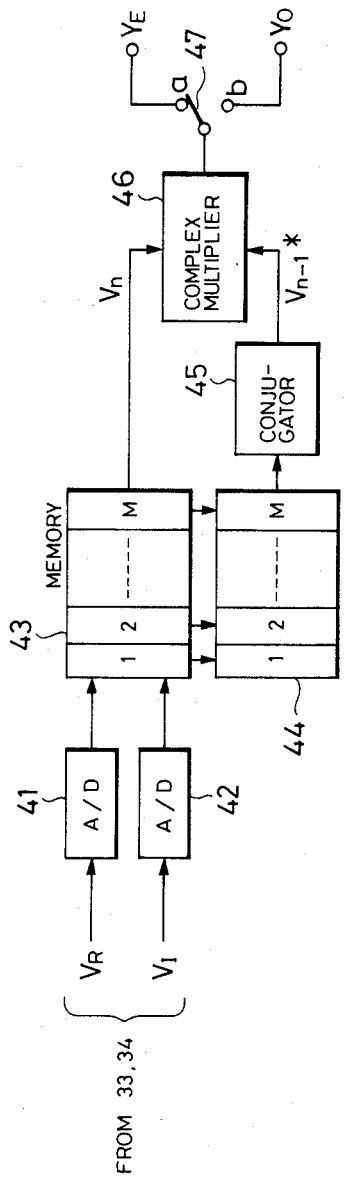
Figure 5:
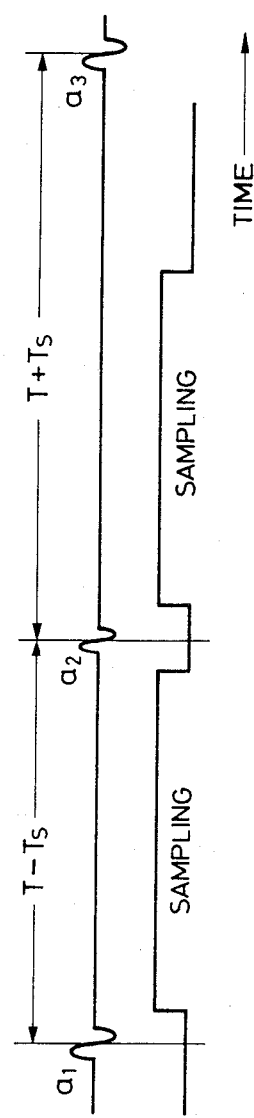

FIG. 4 shows the constitution of the phase difference detecting means 4 shown in FIG. 1. A/D converters 41 and 42 samples the outputs $V_R$ and $V_I$ of the phase comparator 3 every predetermined period of time to convert the same in the manner of A/D conversion. FIG. 5 shows the periods of time in which this sampling operation is effected. As shown in FIG. 5, after the first pulse $a_1$ has been transmitted, the output is sampled for a period of time in which the signals reflected from points of the object located at different depths are effectively detected, in other words, from a time immediately after the transmission of $a_1$ to a time immediately before the transmission of the next pulse. After the second pulse $a_2$ has been transmitted, or after the transmission of each of other pulses which follow has been effected, the sampling is effected for the same period of time. M rows of data are obtained from each of the outputs $V_R$ and $V_I$ by the sampling with respect to each pulse transmission. These data rows are successively stored in a memory 43 having addresses in the direction of the depth. At this time, the data rows which have been stored in the memory 43 with respect to the preceding pulse transmission step are transferred to another memory 44 having addresses in the direction of the depth. Accordingly, the values of the vector $V_n$ obtained with respect to the depths 1, 2, . . . M are constantly stored in the memory 43 while the values of the vector $V_{n-1}$ calculated with respect to the depths 1, 2, . . . M in the preceding step are stored in the memory 44. These values of the vectors $V_n$ and $V_{n-1}$ are read out in the order of the depths 1, 2, . . . M, and each of the latter is converted by a conjugator 45 into a vector $V_n$ $1^*$ which is the complex conjugate of $V_{n-1}$. The values of the vectors $V_{n-1}*$ and $V_n$ are multiplied one into the other by a complex multiplier 45, thereby obtaining the product $Y_n = V_n \cdot V_{n-1}^*$ of these vectors with respect to each depth. When n is an even number, switch 47 is switched on at a side a to output $Y_n$ as $Y_E$. When n is an odd number, the switch 47 is switched on at a side b to output $Y_n$ as $Y_O$.

Figure 6B:
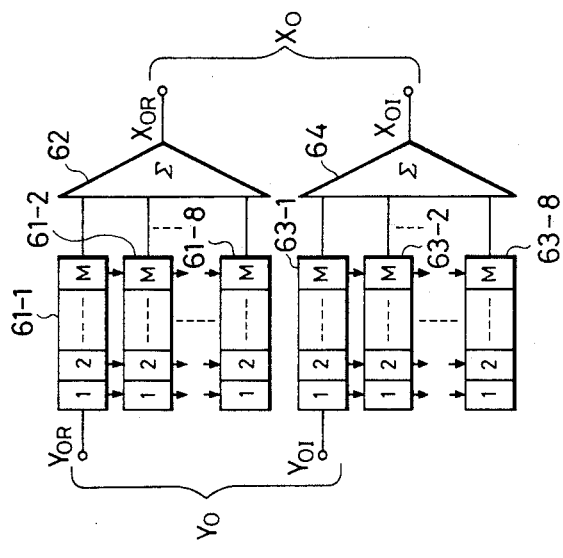
Figure 6A:
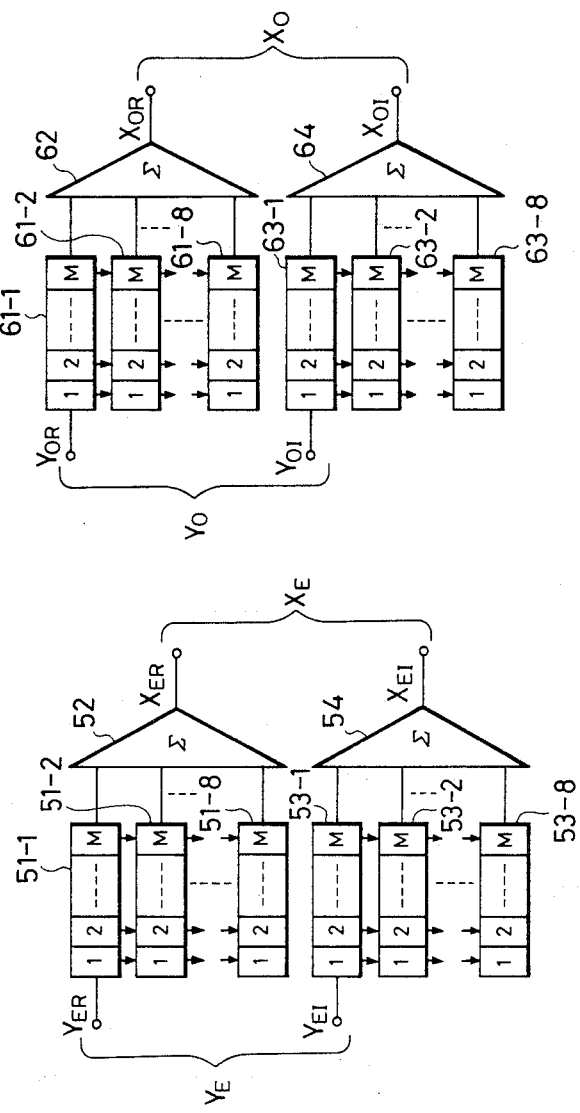

FIG. 6A shows the constitution of the vector adder 5. The vector adder 5 has eight memories 51-1, 51-2 . . .

51-8 each of which has addresses 1, 2 . . . M in the direction the depth for retaining the values of the real part $Y_{ER}$ of the vector $Y_E$ obtained in the past eight steps while successively shifting these values. The vector adder 5 also has eight memories 53-1, 53-2 . . . 53-8 each of which has addresses 1, 2 . . . M in the direction of the depth for retaining the values of the imaginary part $Y_{EI}$ obtained in the past eight steps while successively shifting these values. Each time the values of the vector $Y_E$ are supplied from the phase difference detecting means shown in FIG. 4, the value of the real part $Y_{ER}$ of the vector $Y_E$ is stored with the corresponding address in the memory 51-1. At the same time, items of data $Y_{ER}$ stored in the past seven steps are respectively shifted to the lower memories. When these operations are completed, the output of an adder 52 exhibits a value $X_{ER}$ which is obtained by adding eight values of $Y_{ER}$ stored in the memories 51-1 to 51-8. With respect to the imaginary part $Y_{EI}$, the same shift operations are effected in the memories 53-1 to 53-8, the output of an adder 54 exhibits a value $X_{EI}$ which is obtained by adding eight values of $Y_{EI}$. By the effect of these operations, the adder 5 outputs the added vector $X_E$ calculated from the values of the $Y_E$ in the past eight steps.

The vector adder 6 shown in FIG. 6B has the same constitution as that of the vector adder 5. $X_{OR}$ is obtained by the operations of memories 61-1 to 61-8 and an adder 62, and $X_{OI}$ is obtained by the operations of memories 63-1 to 63-8 and an adder 63. Each time $Y_O$ is given with respect to each depth, the added vector $X_O$ is calculated from the values of $Y_O$ obtained in the past eight steps.

Figure 7:
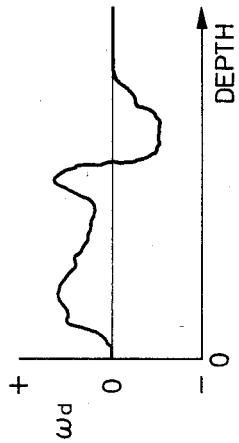
FIG. 7 is a graph of an example of a display of the embodiment shown in FIG. 1.

The items of data $X_E$ and $X_O$ are input into a phase difference detecting means 7 of the same constitution as that shown in FIG. 4, thereby calculating the vector $U(U=X_EX_O^*$, where $X_O^*$ is the vector which represents the complex conjugate of $X_O$). Form the items of data on the vector U calculated with respect to each depth, the value of $\omega d$ can be obtained through the angle calculating unit 8 and the divider 9 with respect to each depth. The value of $\omega d$ corresponding to each of the depths 1, 2 . . . M is displayed on the display 10. FIG. 7 shows an example of this display, in which the ordinate represents the value of $\omega d$ and the abscissa represents the depth. Through the image of this display, the velocity distribution in the object, e.g., the velocity distribution of a blood stream.

In the embodiment described, the mean of the velocity measured during periods of time corresponding to the pulse transmission effected in the past sixteen steps is continuously calculated by the operations of the vector adders 5 and 6 which have been described with reference to FIGS. 6A and 6B. The mean value is updated each time a pulse is transmitted. To effect these operations, $X_E$ and $X_O$ are read out each time $Y_E$ and $Y_O$ are given in response to each pulse transmission, but the read of them may be other wise effected such that $Y_E$ is read each time the process of storing the items of data $Y_E$ in the memories 51-1 to 51-8 and the memories 53-1 to 53-8 is completed with respect to the past sixteen transmission steps, and that, similarly, $X_O$ is read each time the process of storing the items of data $Y_O$ in the memories 61-1 to 61-8 and the memories 63-1 to 63-8 is completed. In that case, the mean of the velocity is updated every other sixteen transmission steps. In an arrangement in which the mean is updated every other sixteen transmission steps, a sequence of operations may be effected such that the transmission step is first repeated eight times at time intervals of $T-T_S$ to obtain the value of $X_E$, and it is then repeated eight times at time intervals of $T+T_S$ to obtain the value of $X_O$.

Figure 8:
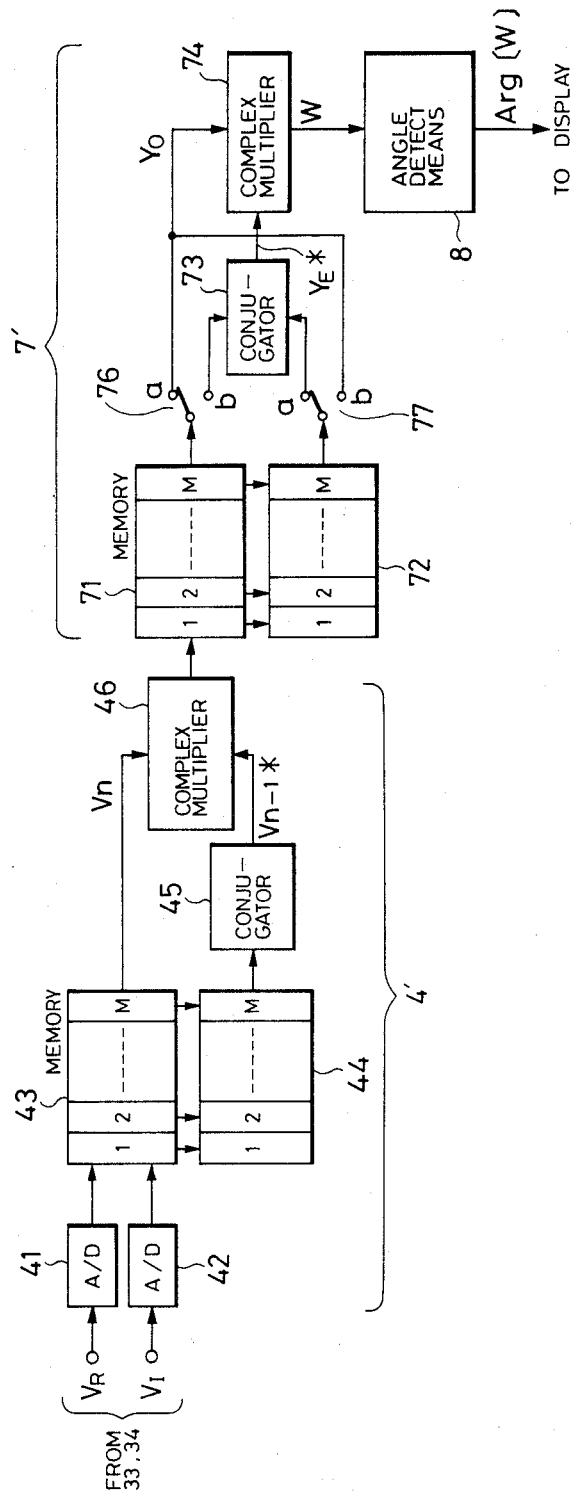

FIG. 8 shows another embodiment of the present invention in which the phase difference between $Y_E$ and $Y_O$ is directly obtained without carrying out the process of vector addition with respect to $Y_E$ and $Y_O$. Only a portion which corresponds to the block 12 of FIG. 1 is shown in FIG. 8. Other components are the same as those in the arrangement shown in FIG. 1. In the embodiment shown in FIG. 8, the arrangement of the blocks 41 to 46 is the same as that shown in FIG. 4, and the vector $Y_n(Y_n=V_n.V_{n-1}^*)$ is obtained at the depths 1, 2 . . . M. This section constitutes a first phase difference comparison circuit 4'. The vector $Y_n$ measured at each depth is written into a memory 71 having M addresses in the direction of the depth. At this time, the vector $Y_{n-1}(Y_{n-1}=V_{n-1}.V_{n-2}^*)$ which has been calculated after the preceding transmission step is transferred from the memory 71 to a memory 72. When the step of transferring data in this manner is completed, $Y_n$ and $Y_{n-1}$ are read out. One of them is supplied to a conjugater 73 by way of switches 76 and 77, and the other is supplied to one of input terminals of a complex multiplier 74 by way of these switches 76 and 77. The vector converted by the conjugator 73 into the complex conjugate is supplied to the other input terminal of the complex multiplier. The switches 76 and 77 are switched on at sides a when n is an even number, and they are switched on at sides b when n is an odd number. Accordingly, the output W of the complex multiplier 74 is constantly represented by an equation:

$$W=Y_O.Y_E^*$$

This process is repeated until the write of the items of data $Y_n$ with respect to the depths 1, 2 . . . M is completed. A new value of the vector $Y_n$ is written into the memory 71 to repeat the above-described process each time a pulse is transmitted. The circuitries 71 to 77 constitute a second phase difference comparison means 7' for calculating a vector W which indicates the difference between the phase difference $Y_n$ detected by the first phase difference detecting means 4' and the phase difference $Y_{n-1}$ detected by the same in the proceding step. This vector W is converted into an angle Arg{W} by the angle detecting means 8 by calculating an equation:

$$Arg\{W\}=\tan^{-1}[W_I/W_R]$$

where $W_I$ is the imagnary part of the vector; and $W_R$ is the real part of the vector. Since the value of Arg{W} corresponds to $2T_S\omega d$, the velocity distribution can be displayed in a real time manner by indicating, on the display, the values of Arg{W} which are successively calculated with respect to the depths 1, 2 . . . M. A type of display having an after-image property may be employed to indicate the variation of the velocity at each depth during a period of time of past several transmission steps, as shown in FIG. 9A. Also a type of display having a frame memory may be employed to display the variation of the velocity at a depth in relation to time by selecting only the data on the velocity at the depth from the values of Arg{W} indicating the velocity at the depth 1, 2 . . . M, successively writing the selected data into the frame memory, and successively shifting items of data which have been written in the frame memory in the past steps. FIG. 9B shows an example of this type of display.

FIG. 10 shows still another embodiment of the present invention. In this embodiment, the constitution and operation of the section in which the vector U is calculated, namely, the section including the phase difference detecting means 4 and 7 and the vector adders 5 and 6 are the same as those shown in FIGS. 1 to 7. The vector U which is successively detected is considered as a time series $U_n$, and a vector:

$$Z_n = \overset{n}{\underset{1}{\pi}} U_n$$

is formed. A complex multiplier 22 and a memory 24 having addresses 1, 2 ... M in the direction of the depth are provided to obtain this vector $Z_n$ at each depth. The vector $Z_n$ is converted by a Fourier transformer 26 in the manner of Fourier transform, and the output of the Fourier transformer is indicated on the display. The display is effected substantially in the same form as that shown in FIG. 9A, with all of the different velocity components at each depth being indicated.

The measurable range of the Doppler shift frequency in the above-described embodiments will be described below. In the above-described embodiments, two phases can be detected without indeterminateness in the range of the phase of vector U or the vector $W \pm \pi$. Accordingly, the Doppler shift angle frequency can be detected within a range:

$$-\frac{\pi}{2T_S} < \omega d < \frac{\pi}{2T_S}.$$

Therefore, the Doppler shift frequency fd can be detected within a range:

$$-\frac{1}{4T_S} < fd < \frac{1}{4T_S}$$

On the other hand, in the process of transmitting pulse on the basis of the conventional pulse doppler method as shown in FIG. 3B, the data is obtained every period of T seconds so that the Doppler shift frequency fd can be detected within a range:

$$-\frac{1}{2T} < fd < \frac{1}{2T}.$$

Thus the measurable velocity range in accordance with the present invention is widened by being multiplied by $T/2 \cdot T_S$.

On the other hand, the maximum depth D up to which the velocity of the object can be measured is represented by $$D = (T - T_S) \cdot \frac{S}{2}$$

where S is the acoustic velocity. Then the product of D and the maximum detectable Doppler shift frequency $fd_{max}$ is detectable is $$D \cdot fd_{max} = \frac{T - T_S}{8T_S} \cdot S.$$

Since, in accordance with the conventional pulse Doppler method, $$D \cdot fd_{max} = \frac{S}{4},$$

the value of $D \cdot fd_{max}$ in accordance with the present invention is larger than that obtained by the conventional pulse Doppler method, when $$\frac{T - T_S}{2T_S} > 1,$$

or $T_S < T/3$. That is, it is preferable to select a value of $T_S$ smaller than $T/3$.

What is claimed is:

1. An ultrasonic velocity meter comprising:
   transmission means for repeatingly transmitting acoustic waves in the form of pulses toward an object at alternate first and second time intervals different from each other;
   reception means for detecting reflected waves generated by said waves in the form of pulses and reflected by said object;
   a phase comparator for generating first and second mixed waves by mixing a reception signal with two reference waves, the phases of said reference waves being shifted 90 degrees from each other;
   first phase difference detection means for detecting the phase differences between a pair of vectors representing said first and second mixed waves generated from said reflected wave obtained by each operation of transmitting one of said pulses and a pair of vectors representing said first and second mixed waves obtained by the preceding operation of transmitting another one of said pulses;
   second phase difference detection means for detecting the difference between first phase differences caused in relation to said first time interval and second phase differences caused in relation to said second time interval, with respect to phase differences successively supplied from said first phase difference detection means; and
   display means for displaying the output of said second phase difference detection means as the velocity of said object.

2. An ultrasonic velocity meter according to claim 1, further comprising vector adder means for adding and averaging the values of each of said first and second phase differences after the step of obtaining one of said first or second phase differences has been repeated a plurality of times, wherein said second phase difference detection means detects the difference between the averaged values of said first and second phase differences.

3. An ultrasonic velocity meter according to claim 1, wherein said first phase difference detection means for sampling said first and second mixed waves for a certain period of time after one of said pulses has been transmitted, and means for detecting the phase differences between a pair of vectors representing said first and second mixed waves sampled with respect to each operation of transmitting one of said pulses and a pair of vectors of said first and second mixed waves sampled with respect to the preceding operation of transmitting another one of said pulses.

4. An ultrasonic velocity meter according to claim 2, further comprising a vector multiplier for accumulating and multiplying vectors indicating the phase difference successively supplied from said second phase difference detection means, and a Fourier transformer for converting the output of said vector multiplier in the manner of Fourier transform, vectors thereby converted being displayed.

5. An ultrasonic velocity meter according to claim 1, wherein said first and second time intervals are represented by $T-T_S$ and $T+T_S$ where $T_S<T/3$.

6. An ultrasonic velocity meter for detecting the velocity of an object from the phase variations of reflected waves from said object obtained by repeatingly transmitting ultrasonic pulses toward said object, comprising:

transmission means for repeatingly transmitting ultrasonic pulses toward said object, at least with a first time interval and second time interval which are different from each other;

reception means for receiving ultrasonic waves reflected from said object caused by irradiation of ultrasonic pulses to said object;

phase detecting means for successively detecting the phases of said reflected waves;

a first phase difference detection means for successively detecting a first phase difference between phases of reflected waves caused by ultrasonic pulses transmitted with said first time interval and a second phase difference between phases of reflected waves caused by ultrasonic pulses transmitted with said second time interval;

a second phase difference detection means for detecting a third phase difference between said first and second phase differences with are detected by said first phase difference detection means; and means for measuring the velocity of said object by dividing said third phase difference with a time parameter which is the difference between the first and second time interval.

7. An ultrasonic velocity meter according to claim 6, further comprising adder means for adding and averaging the values of said first phase difference successively obtained by said first phase difference detection means and for adding and averaging the values of said second phase difference successively obtained by said first phase difference detection means, and wherein, said second detection means detects phase differences between the averaged values of said first and second phase differences.

8. An ultrasonic velocity meter for detecting the velocity of an object from the phase variations of reflected ultrasonic pulses toward said object, comprising:

transmission means for repeatingly transmitting ultrasonic pulses toward said object, at lest with a first condition and a second condition different from said first condition;

reception means for receiving ultrasonic waves reflected from said object caused by irradiation of ultrasonic pulses to said object;

phase detecting means for successively detecting the phases of said reflected waves;

a first phase difference detection means for successively detecting a first phase difference between phases of reflected waves caused by ultrasonic pulses transmitted with said first condition and a second phase difference between phases of reflected waves caused by ultrasonic pulses transmitted with said second condition, a second phase difference detection means for detecting a third phase difference between said first and second phase differences which are detected by said first phase difference detection means; and means for measuring the velocity of said object by dividing said third phase difference with a time parameter which is the difference between the first and second time interval.

* * * * *